L. COHEN.
AUTO BUMPER.
APPLICATION FILED MAY 18, 1920.
1,351,837.
Patented Sept. 7, 1920.
2 SHEETS—SHEET 2.
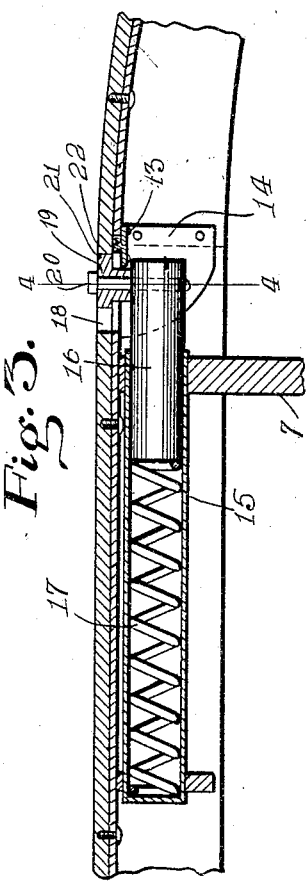
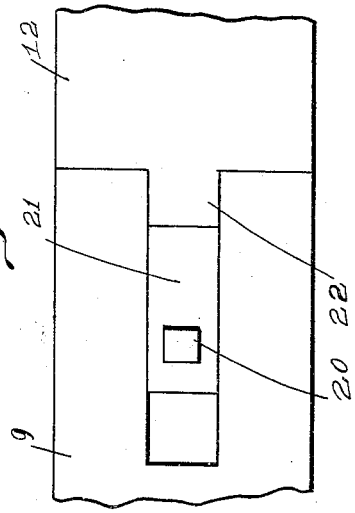
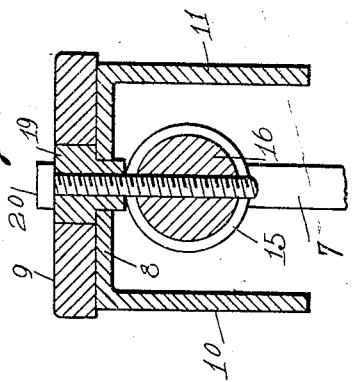
Witness
Inventor
Louis Cohen.
By C. A. Snow & Co.
Attorneys

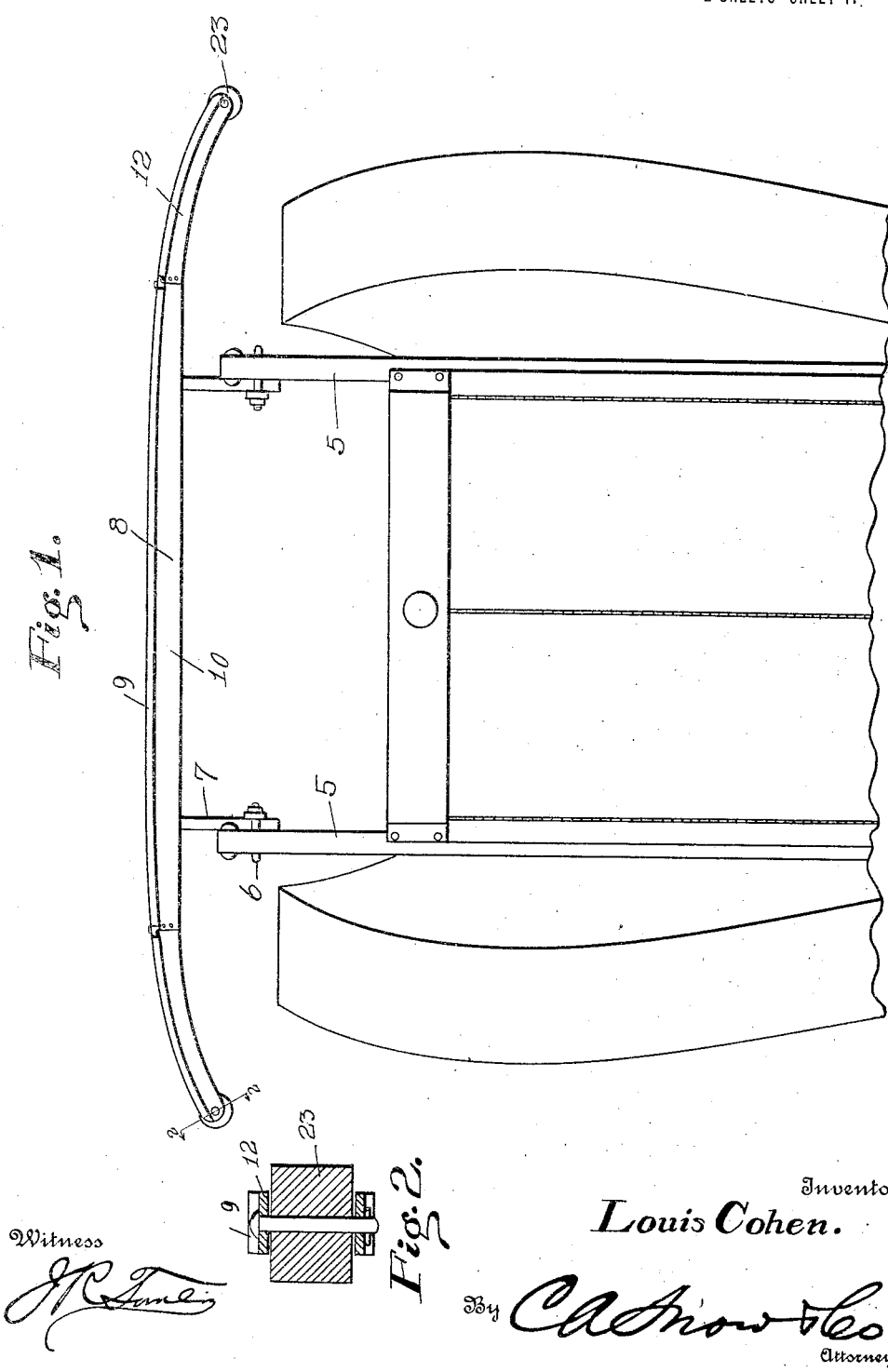

UNITED STATES PATENT OFFICE.

LOUIS COHEN, OF JOHNSTOWN, NEW YORK.

AUTO-BUMPER.

1,351,837.   Specification of Letters Patent.   Patented Sept. 7, 1920.

Application filed May 18, 1920. Serial No. 382,240.

*To all whom it may concern:*

Be it known that I, LOUIS COHEN, a citizen of the United States, residing at Johnstown, in the county of Fulton and State of New York, have invented a new and useful Auto-Bumper, of which the following is a specification.

This invention relates to bumpers, and more particularly to a bumper construction especially designed for use in connection with motor vehicles.

The primary object of the invention is to provide a bumper of this character having novel means for preventing the displacement of the bumper, in the event that the protruding ends thereof contact with rigid obstructions.

A further object of the invention is to provide a device of this character having pivoted end sections together with means for automatically moving these end sections in one direction so the end sections are normally held in proper operative relation with the main, or body portion of the bumper.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a fragmental plan view of an automobile having a bumper constructed in accordance with the present invention applied thereto;

Fig. 2 illustrates a sectional view taken on line 2—2 of Fig. 1;

Fig. 3 illustrates a fragmental sectional view of a bumper constructed in accordance with the present invention;

Fig. 4 illustrates a sectional view taken on line 4—4 of Fig. 3; and

Fig. 5 illustrates a fragmental front elevational view of one end of the bumper.

Referring to the drawings in detail, the bumper forming the subject matter of the present invention is shown as applied to the side rails 5 of the chassis of an automobile by means of the bolts 6, which have connection with the connecting arms 7 of the bumper proper.

The bumper, or body portion thereof is indicated at 8, and includes a front wall 9 of relatively heavy metal, and top and bottom walls 10 and 11 respectively, the top and bottom walls being arranged in spaced relation with each other to substantially house the mechanism of the bumper, to be hereinafter more fully described.

The bumper includes pivoted end sections 12 hingedly connected to the body portion 8, by means of the hinges 13, which hinges have one of their ends connected to the end sections 12, the opposite ends of the hinges having connection with the body portion 8.

Associated with the hinges 13 are the guide members 14, which have connection with the end sections and are of lengths to extend an appreciable distance between the top and bottom walls 10 and 11 to span the joints between the body 8 and the end sections so that the end sections are maintained in proper alinement and in proper relation with the body portion 8 of the bumper.

Disposed adjacent each end of the body 8, and provided between the top and bottom walls 10 and 11 are the tubular spring supporting members 15, each of which has one of its ends open to receive the plungers 16, which plungers 16 operate against the tension of the coiled springs 17, which springs normally urge the plungers 16 outwardly.

A slot 18 is formed in the front wall 9 of the bumper, adjacent the respective ends thereof, which slots provide guide ways for the lugs 19, which lugs have connection with the plungers 16 through the relatively long screw bolts 20, and as shown, each of these lugs is provided with an extension 21 contacting with the extensions 22 provided on the ends 12, so that movement of the end sections will be transmitted to the plungers 16 through the lugs 19.

Rollers 23 are pivotally supported between the top and bottom walls of the respective end sections adjacent the ends thereof, so that portions of the rollers extend beyond the ends of the end sections 12, and since these end sections 12 extend beyond the planes of the sides of the motor vehicle to which the bumper is applied, it is obvious that the end sections 12 will meet with obstructions which would ordinarily be passed by the fenders or sides of the motor vehicle, especially is the foregoing so when the motor vehicle is being backed from a garage.

In operation if the end sections meet with obstructions, that is when the motor vehicle to which the bumper is applied is moving in one direction, it will be seen that the end sections will move to permit the motor vehicle to pass the obstruction, thus eliminating any possibility of the bumper being caught and displaced from the motor vehicle.

After the motor vehicle has passed the obstructions, the end sections 12 are returned to their normal positions, due to the tension of the coiled spring 17, urging the plungers 16 from their tubular supports 15.

Having thus described the invention, what I claim as new is:

1. A bumper including a body portion, end sections pivotally connected to the body portion, a tubular spring supporting member supported within the body portion, a plunger operating in each spring supporting member, a lug having connection with each plunger, and each lug having an extension contacting with the respective end sections, whereby movement of the end sections produces a relative movement of the plungers, and a coiled spring supported within each tubular spring supporting member for urging the plungers in one direction.

2. A bumper including a body portion, said body portion including a front wall and spaced bottom and top walls, end sections pivotally connected to the body portion, guide members carried by the end sections and adapted to contact with the top and bottom walls of the body portion for securing the end sections in alinement, and means carried by the body portion for moving the end sections in one direction.

3. A bumper including a body portion, said bumper having a front wall and top and bottom walls, said front wall having a slot provided adjacent the ends thereof, end sections pivotally connected to the body portion, spring supporting members provided on the body portion, a plunger operating in one end of each of the spring supporting members, a lug operating in each of the slots, in the body portion, said lugs having contact with the plungers, and said lugs having contact with the end sections, whereby movement of the end sections causes the lugs to move in the slots to move the plungers within the spring supporting members.

In testimony that I claim the foregoing as my own, I have hereto affixed my signature in the presence of two witnesses.

LOUIS COHEN

Witnesses:
   JULIA F. VAN SICKLER.
   ALFRED D. DENNISON.